United States Patent [19]

Albo

[11] 4,370,183
[45] Jan. 25, 1983

[54] APPARATUS AND METHOD FOR HOLDING AND TACKING MATERIAL

[75] Inventor: Ronald T. Albo, Los Gatos, Calif.

[73] Assignee: Caterpillar Tractor Co., Peoria, Ill.

[21] Appl. No.: 223,866

[22] Filed: Jan. 9, 1981

Related U.S. Application Data

[63] Continuation of Ser. No. 102,192, which matured from PCT/US79/00917, Oct. 29, 1979, Publication No. WO81/01119, Apr. 30, 1981, 102(e) date Oct. 29, 1979, abandoned.

[51] Int. Cl.³ .............................................. B29H 17/02
[52] U.S. Cl. .................................. 156/117; 156/162; 156/172; 156/185; 156/397; 156/431; 242/4 BE
[58] Field of Search .............. 156/117, 121, 162, 165, 156/169, 172, 173, 184, 185, 187, 397, 431; 242/36, 37, 57, 74, 4 R, 4 B, 4 BE

[56] References Cited

U.S. PATENT DOCUMENTS

| | | | |
|---|---|---|---|
| 2,915,102 | 12/1959 | Alexeff | 152/356 R |
| 3,458,146 | 7/1969 | Warner | 242/4 BE |
| 3,606,921 | 9/1971 | Grawey | 156/117 X |
| 3,864,188 | 2/1975 | Grawey et al. | 156/397 |
| 3,954,538 | 5/1976 | Grawey | 156/117 |
| 4,042,435 | 8/1977 | Houck | 156/121 |
| 4,295,916 | 10/1981 | Stevens | 156/117 X |

Primary Examiner—Edward C. Kimlin
Assistant Examiner—Thomas Bokan
Attorney, Agent, or Firm—Robert A. McFall

[57] ABSTRACT

An apparatus (30) and method is provided for holding and tacking an elongate material (12) onto a body (14), which body (14) may be toroidal in shape. The material (12) is applied to the body (14) by means of a shuttle (22) rotating about the body (14) in a plane transverse to a plane containing the body (14). The apparatus (30) includes a tacker arm (76) having a clamping means (104) for clamping and unclamping the end of the material (12), extending from the shuttle (22), to the arm (76). The arm (76) is pivotally mounted on a carriage (58) for movement between a first position, wherein the material (12) clamped to the arm (76) is held against the body (14), and a second position, spaced from the body (14). In the first position of the arm (76), the body (14) will move the arm (76) until the clamping means (104) unclamps the material (12) whereupon the arm (76) is pivoted to the second position. The carriage (58) is reciprocable for moving said arm (76) between said second position, spaced from the body (14), and a third position, remote from the shuttle (22).

16 Claims, 7 Drawing Figures

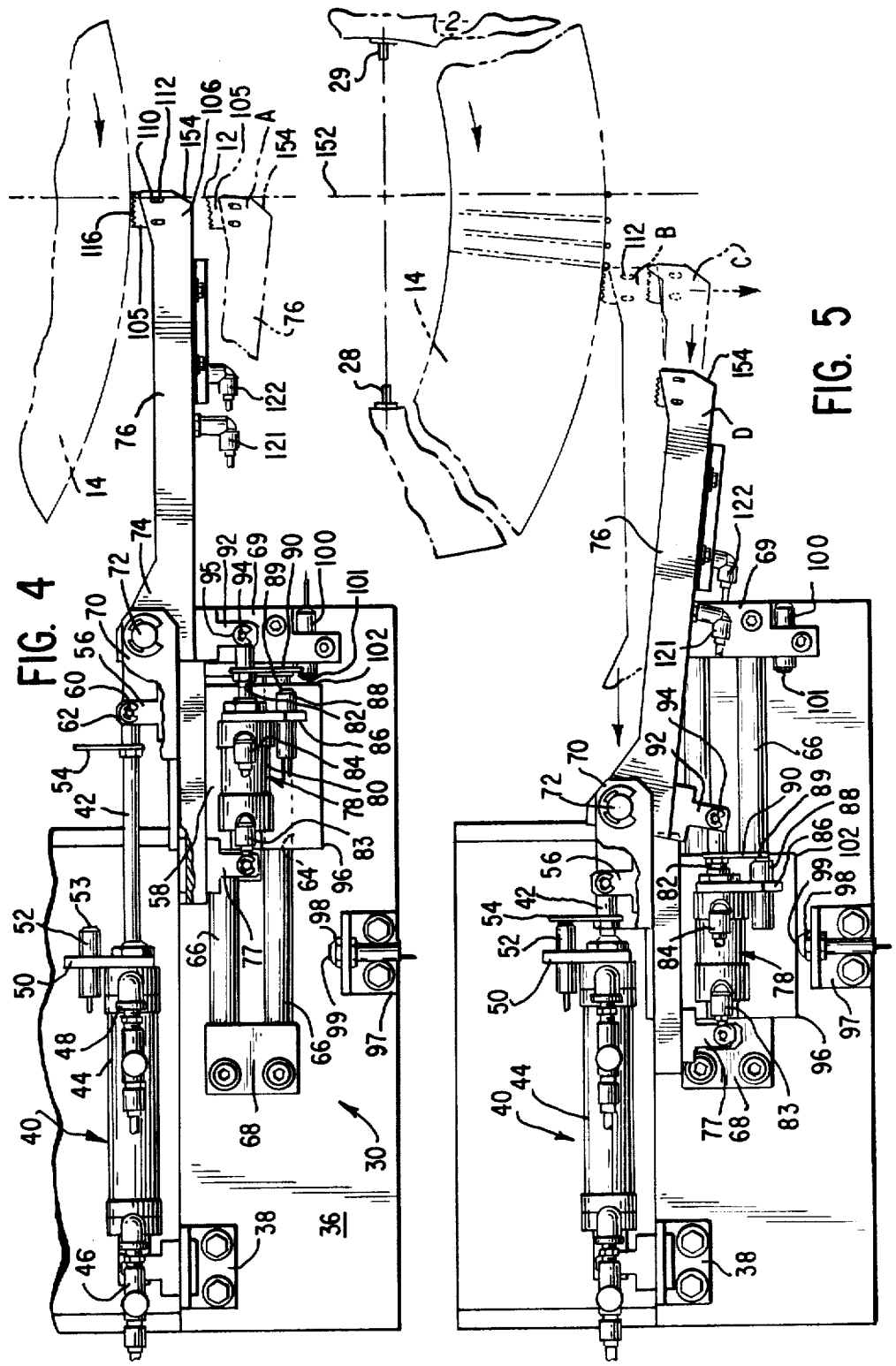

APPARATUS AND METHOD FOR HOLDING AND TACKING MATERIAL

This is a continuation, of Ser. No. 102,192, filed Oct. 29, 1979 now abandoned.

DESCRIPTION

1. Technical Field

This invention relates to material-tacking apparatus and, more particularly, to an apparatus and a method for holding and tacking an elongate material under tension to a body.

2. Background Art

Many articles are formed in part by wrapping or winding a material helically about the body of the article. One such article is in the tire manufacturing area wherein an annular body has a layer of elongate material helically wound thereon substantially radially about the body of the tire. The elongate material is applied under tension, which tension is preferably kept uniform, not only at the start up of the winding or wrapping operation, but also continuously throughout the application of the elongate material and remains so at the conclusion of the winding step.

Heretofore, the tensioned cable was manually held against the body by means of a tacking strip. The strip was then tacked or stitched by hand onto the body member. A shuttle, which rotates in a plane substantially transverse to the plane of rotation of the body, is rotated about the body as the body is rotated in the plane of the body. An operator remained with the apparatus to visually observe the application of the elongate material to the body and when the wrapping was completed, the operator manually shuts off the shuttle drive mechanism and the body rotating mechanism and manually tacks or stitches the elongate material to the body prior to severing the elongate material connected to the supply. If, during the application of the elongate material to the body, the elongate material broke, the operator would shut down the equipment and attempt to catch the loose end of the elongate material so as to tack the end to the body before the elongate material became unraveled.

The manual tacking steps added labor costs to the end product and made it extremely difficult to quality control the tension on the elongate material at start up and at shutdown of winding on each body, as well as maintaining uniformity of tacking or stitching both at start up and at shutdown.

DISCLOSURE OF INVENTION

The present invention is directed to overcoming one or more of the problems as set forth above.

In one aspect of the present invention, there is provided an elongate material clamping and tacking apparatus adapted to be associated in relatively close proximity to a shuttle that is used for winding the elongate material on the body. The apparatus includes means for advancing, pivoting and retracting a tacker arm relative to the area where elongate material is being applied to the body. Means are provided on the tacker arm for clamping the material to the arm. Signaling means are provided on the body for activating the arm to initially tack the cable to the body as the shuttle starts to rotate relative to the advancing body. The advancing body moves the tacker arm to a position whereby the elongate material is released from the clamping means on the arm. The arm is then pivoted away from the body prior to the full retraction of the arm to a non-operational position. The signaling means carried by the body will signal completion of the winding operation to stop both the rotation of the body and the shuttle, whereupon the arm advances and pivots against the body to tack the elongate material thereto. The elongate material is then stitched to the body and severed from the supply. The tacker arm is then pivoted away from the body and is activated to clamp the end of the severed elongate material to the tacker arm prior to tacking and winding the elongate material on a second body.

BRIEF DESCRIPTION OF DRAWINGS

FIG. 4 is a top plan view of the holding and tacking apparatus initially tacking a strand of elongate material to a body;

FIG. 5 is a top plan view, similar to FIG. 4, only showing the fully retracted position of the apparatus and with the tacker arm shown in phantom at two intermediate positions between the body and the retracted position;

BEST MODE FOR CARRYING OUT THE INVENTION

Figure 1:
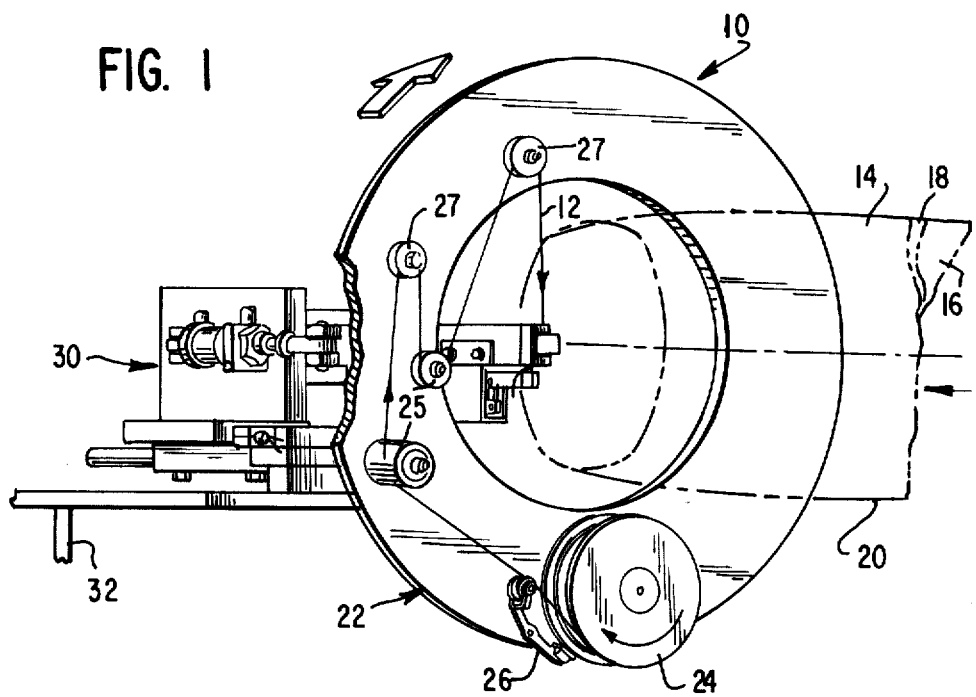
FIG. 1 is a perspective view of the elongate material holding and tacking apparatus in operative position with respect to a body of a toroidal member and to a material-winding shuttle.

Referring broadly to FIG. 1, a winding or wrapping apparatus 10 is illustrated for applying elongate material 12, such as cable or the like, in a pattern to the outer surface of a body, such as a toroidal member, 14. The body or toroidal member 14, in the illustrated embodiment, is a torus tube carcass comprised of a disintegratable core 16 upon which is disposed one or more layers of rubber material 18. The body 14 is positioned on a side wall 20 and is rotated in the plane of the side wall 20 transverse to the normal axis of rotation of the body 14. A shuttle 22 is rotatably driven in a plane substantially transverse to the plane of the side wall 20 about the body 14 so that as the body 14 is rotated relative to the rotation of the shuttle 22, the elongate material 12, such as cable or the like, is continuously wound on the body 14 in a helical or spiral pattern. Although the drawing illustrates the body 14 rotating in a horizontal plane with the shuttle 22 rotating in a vertical plane transverse thereto, it is to be understood that the body 14 could be vertical and could rotate in a vertical plane with the shuttle 22 being in a horizontal plane transverse thereto without departing from the invention. The shuttle 22 carries a spool 24 of elongate material 12 and has a braking apparatus 26 for applying a drag to the spool 24 so that the elongate material 12 drawn from the spool 24 will be drawn under a substantially uniform tension. Mounted on the shuttle 22 is a series of guides 25 and pulleys 27 which permit the elongate material 12 to be drawn off from the spool 24 and to be applied to the surface of the body 14 under a substantially uniform tension. The body 14 has a pair of diametrically disposed, radially inwardly projecting flag or signaling members 28 and 29 carried by the body 14 as is illustrated somewhat schematically in FIG. 5.

Figure 6:
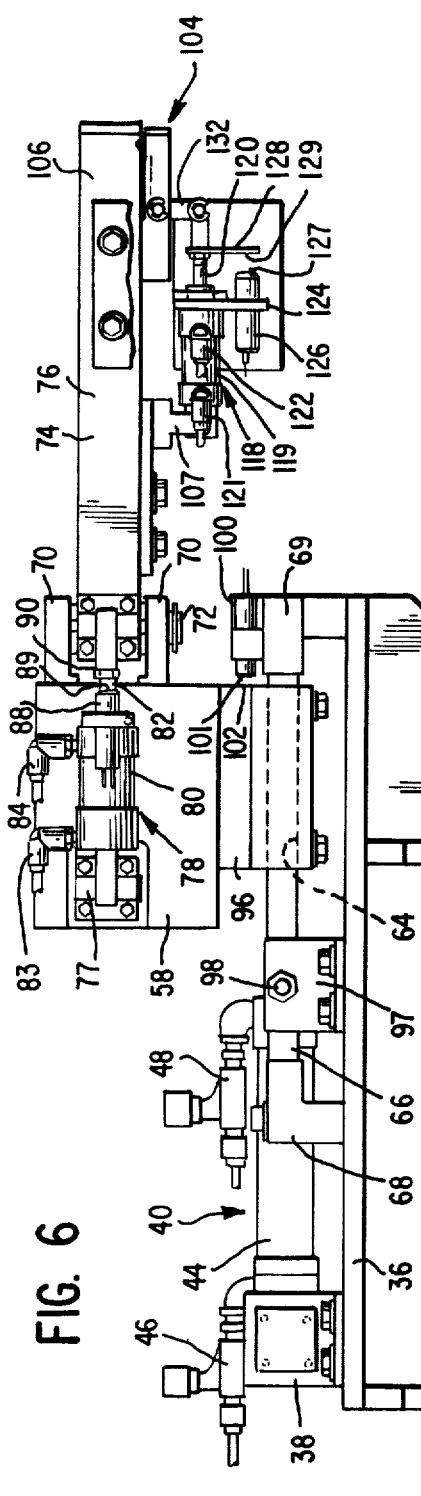
FIG. 6 is an elevational view of the apparatus of FIG. 1 with the elongate material clamped to the distal end portion of the tacker arm.
Figure 7:
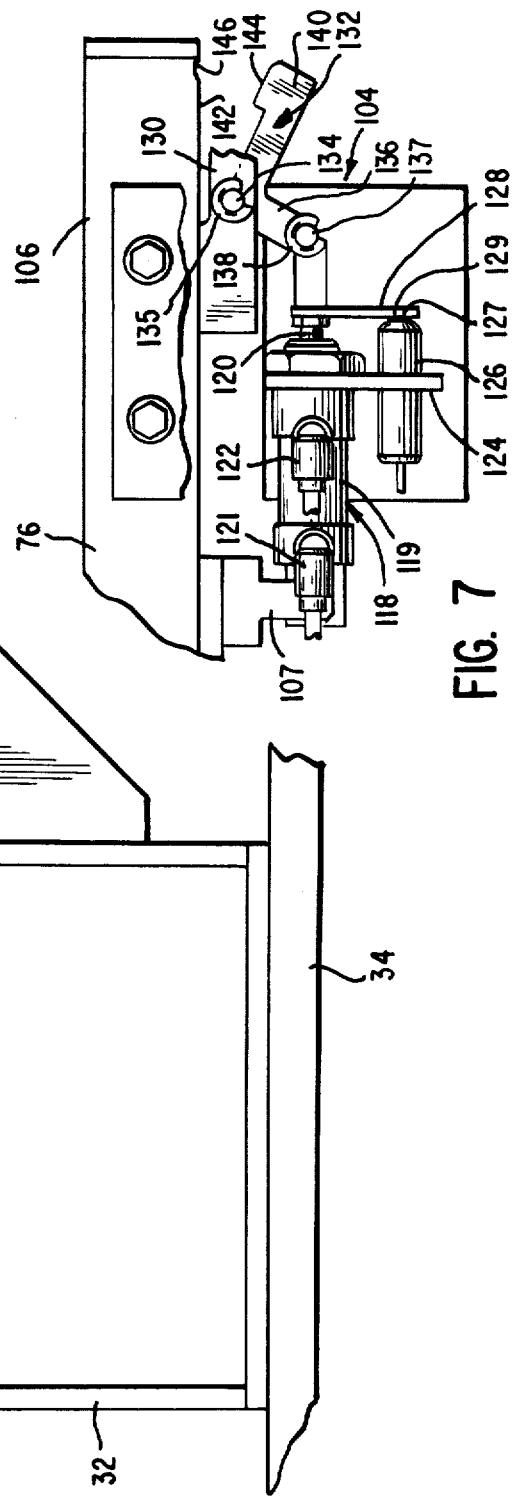
FIG. 7 is an enlarged, partial elevational view of the distal end portion of the tacker arm of FIG. 6 showing the clamping apparatus in the unclamped position.

To tack the elongated material or cable 12 against the body 14 at the start of the winding operation and to tack the last one or more passes of the elongate material or cable 12 to the body 14 at the completion of the winding or wrapping operation, an elongate material holding and tacking apparatus 30 is provided. The apparatus 30, as best shown in FIGS. 4-6, is mounted on a frame 32 fastened to the floor or to a base 34. Frame 32 has a deck 36 upon which is bolted a bracket 38 for supporting one end of an actuator 40. The actuator 40, as well as those actuators hereinafter introduced, is preferrably an air actuator and includes a cylinder 44 in which is reciprocably mounted a piston, not shown, connected to an outwardly extending rod 42. Air from a source of pressurized air is admitted to and is exhausted from the opposite ends of the cylinder 44 through valves 46 and 48 connected to the head and rod ends, respectively, of the actuator 40. Although an air actuator 40 is described, it is to be understood that the actuator could be fluid, hydraulic, mechanical or the like. A bracket 50 is mounted on one end of the cylinder 44 and has a proximity switch 52 thereon with a sensing end 53 facing away from the cylinder 44 in the direction of the rod 42. A member 54 extends transverse to the rod 42 at the outer end thereof and has a ferrous portion in alignment with the proximity switch 52.

The valves 46,48, as well as those valves hereinafter introduced, are conventional solenoid-actuated valves which are spring biased to a first position at which the respective air chambers of the associated actuator is exhausted to atmosphere, and are moved in response to an electrical signal to a position at which pressurized air is admitted to the respective air chamber. The proximity switch 52, as well as those hereinafter introduced, is of the type which is actuated by the presence of a ferrous material, such as the ferrous portion of member 54, in close proximity thereto.

A clevis bracket 56 is fastened to a carriage 58 and extends sidewardly therefrom. The outer end of the rod 42 is fastened to the clevis bracket 56 by means of a pin 60 and a spring clip 62. The carriage 58 has a pair of guides 64 slidably engaging a pair of tracks 66 mounted on the deck 36 by a pair of spaced apart blocks 68,69. The carriage 58 has a pair of vertically spaced apart brackets 70 (FIG. 6) sidewardly extending therefrom between which extends a pivot 72 for securing the proximal end 74 of a tacker arm 76 thereto. Admitting air to the valve 46 of the actuator 40 will move the rod 42, carriage 58 and tacker arm 76 back and forth along an axis substantially parallel to the axis of the rod 42, the carriage 58 being guided on the tracks 66 for producing the linear reciprocating motion of the tacker arm 76.

Mounted on the carriage 58 is a bracket 77 to which one end of a cylinder 80 of an actuator 78 is connected. A rod 82 is axially extendible and retractable from the cylinder by pressurized air, or the like, admitted to or exhausted from the opposite ends of the cylinder 80 through solenoid-actuated valve members 83 and 84. A bracket 86 is mounted on the one end of the cylinder 80 and has a proximity switch 88 thereon with a sensing end 89 facing away from the cylinder 80 in the direction of the rod 82. The distal end of the rod 82 has a member 90 extending transverse to the rod 82 with a ferrous portion thereof aligned with the sensing end 89 of the proximity switch 88. The proximity switch 88 is actuated by the close presence of the ferrous portion 89 of the member 90 as described above with respect to proximity switch 52. The outer end of the rod 82 is connected to a clevis 92 carried by the tacker arm 76 by means of a pin 94 and spring clip 95. The base of the clevis 92 is rigidly secured to the proximal end 74 of the tacker arm 76 and, not only projects transverse to the axial length of the tacker arm 76, but also projects away from the axis of the pivot 72 of said arm. The axis of the pin 94 is parallel to the axis of the pin 72 so that admitting pressurized air to appropriate valve 83,84 of the actuator 78 will extend or retract the rod 82 from the cylinder 80 which will pivot the tacker arm 76 a few degrees clockwise or counterclockwise about the axis of the pin 72. Since the actuator 78 is mounted on the carriage 58, the tacker arm 76 can be pivoted about the pivot 72 and can be moved axially parallel to the tracks 66 simultaneously or independently as desired. A bracket 97 is bolted to the deck 36 and supports a proximity switch 98 with a sensing end 99 pointing inward toward the carriage guides 64. The carriage 58 has a vertically extending ferrous portion 96 (see FIGS. 4,5) at the corner thereof which is positioned to pass in front of and in close proximity to the sensing end 99 of the proximity switch 98. The right-hand block 69 on the deck 36, as viewed in FIGS. 4 and 5, supports a proximity switch 100 with a sensing end 101 pointing toward the carriage 58, which carriage 58 has a ferrous portion 102 in alignment with the proximity switch 100 so that the proximity switch 100 senses the presence of the carriage 58 when the carriage is in the right-hand position on the guides 64.

The apparatus just described provides the operating structure for moving the tacker arm 76 forward and backward, and for pivoting the tacker arm 76 toward and away from the body 14.

Figure 2:
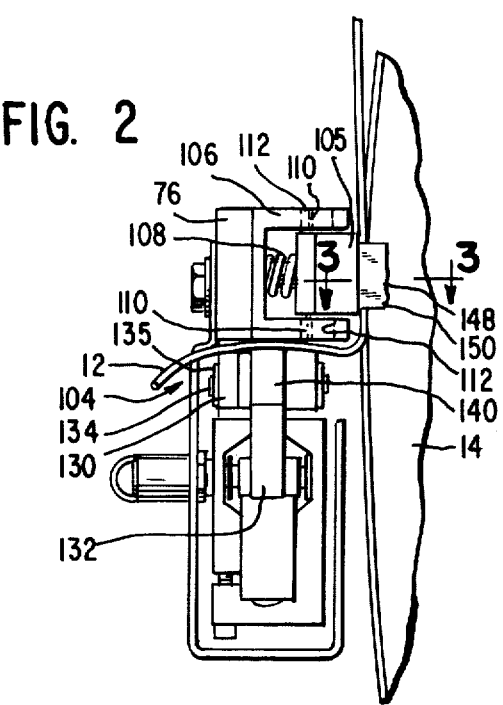
FIG. 2 is an elevational view of the end of the tacker arm and the material-clamping mechanism with the tacker arm bearing against a body to be wrapped.
Figure 3:
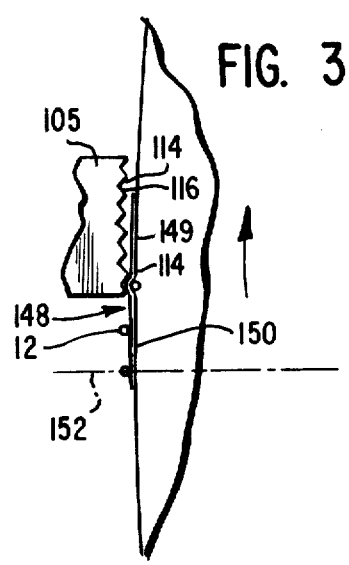
FIG. 3 is a partial cross-sectional view taken along the line 3—3 of FIG. 2.

Referring to FIGS. 2, 3, 6 and 7, an apparatus 104 is shown for clamping and unclamping the loose end of the elongate material 12 to the tacker arm 76. That is, the tacker arm 76 has a tacking head 105 on the distal end portion 106 thereof, which head 105 is spring-urged transverse to the axis of the tacker arm 76 by a compression spring 108 (FIG. 2). Guide pins 110 extend in opposite directions from a shank of the tacker head 105 and engage in elongate slots 112 in the top and bottom surfaces of the tacker arm 76 so as to be guided for spring-urged, limited transverse movement relative to the axis of the tacker arm 76.

The tacking head 105 has a plurality of vertically oriented grooves 114 on the face 116 projecting transverse to the axis of the tacker arm 76. Mounted on the lower side of the tacker arm 76 and carried by the distal end portion 106 of said tacker arm 76 is a bracket 107 supporting one end of an air actuator 118 which includes a cylinder 119 and an axially extendible rod 120. Pressurized air is supplied to the opposite sides of the cylinder 119 through solenoid-actuated valves 121 and 122. A support 124 is secured to the forward end of the cylinder 119 and has a portion projecting outward from the cylinder, which portion receives and mounts a proximity switch 126 having a sensing end 127 facing away from the cylinder 119 in the direction of the rod 120. A member 128 extends transverse to the rod 120 at the outer end thereof and has a ferrous portion 129 in alignment with the sensing end 127 of the proximity switch 126. A bifurcated bracket 130 is secured to the underside of the tacker arm 76 and has a bellcrank lever 132 pivotally mounted thereto by means of a pivot 134 extending through the elbow of the crank. A spring clip 135 secures the pivot 134 to the bracket 130. A short leg 136 of the bellcrank 132 is pivotally connected by a pin 137 and spring clip 138 to the distal end of the rod 120 so that axial movement of the rod 120 will pivot the bellcrank 132 about the pivot 134 to raise and lower a long leg 140 of the bellcrank 132 toward and away from the undersurface 142 of the tacker arm 76. The leg 140 of the bellcrank 132 has a gripping pad 144 on the outer portion thereof which aligns with a notch 146 formed transverse to the axis of the tacker arm 76 in the undersurface 142 thereof.

A strip of elongate material 12 is pulled from the pulley 27 on the shuttle 22 and is laid in one groove 114 of the face 116 of the tacking head 105 (FIG. 3) and is drawn around and under the end portion 106 of the tacker arm 76 to somewhat compress the spring 108 and is then laid in the notch 146 whereupon actuation of a switch, as by tripping a foot pedal, will cause an electrical signal to be directed to and actuate the solenoid valve 121 to admit pressurized air to the head end of the cylinder 119 of the actuator 118 to extend the rod 120 thereby pivoting the bellcrank 132 and clamping the end portion of the elongate material 12 in the notch 146 by contact of the pad 144 on the bellcrank 132 thereagainst. The gripping force of the bellcrank 132 on the elongate material 12 is such that the elongate material 12 has no, or minimal, slack as it extends from the shuttle 22 to the tacker arm 76 prior to starting the winding or wrapping of the elongate material 12 on the body 14. A short strip of tacking tape 148 is threaded between the elongate material 12 and the face 116 of the tacking head 105 (FIGS. 2 and 3) with one end portion 149 of the tape 148 stuck against the projections between the grooves 114 and the other end portion 150 of the tape 148 extending freely, axially outward from the tacker arm 76.

Although, in one embodiment of the invention, one or all of the actuators can be manually controlled without the use of the proximity switches, the preferred embodiment has the proximity switches (52,88,98,100,126) and control valves (46,48,83,84,121,122) connected to an Allen Bradley 1750, Programmable Control. The proximity switches (52,88,98,100,126) each direct an input signal to the computer in response to being actuated while the control valves (46,48,83,84,121,122) each receive an output signal from the computer in response to one or more input signals being fed to the computer.

INDUSTRIAL APPLICABILITY

At the time the elongate material 12 is clamped to the tacker arm 76 and the tacking tape 148 is secured to the tacking head 105, the tacker arm 76 is extended and the axis of the tacker arm 76 lies at an acute angle to the axis of the rod 42, dotted line position "A" of FIG. 4, so that the tacking head 105 is spaced from the body 14 with the elongate material 12 lying generally along a centerline 152 passing, at one end, through the rotational axis of the body 14 and, at the other end, through the outer extremity of the tacker arm 76. The mechanism for rotating the body 14 in the plane of the side wall 20 is actuated, such as by a manual switch, not shown, so that the body 14 commences rotating in a clockwise direction as viewed in FIGS. 4 and 5. At a predetermined point, one of the flags 28 or 29 (FIG. 5) will pass in close proximity to and actuate a proximity switch, not shown, which sends an electrical signal to the computer which directs an output signal to the control valve 83. The control valve 83, in turn, directs pressurized air into the head end of the actuator 78 to pivot the tacker arm 76 toward the body 14 to forcibly engage the tacking head 105 with the elongate material 12 and tacking tape 148 against the outside wall of the body 14. The pivoting of the tacker arm 76 will open the proximity switch 88 which will signal the computer to deactivate the valve 46 to vent the cylinder 44 so that the rod 42, tacker arm 76 and carriage 58 will be free to move to the left as viewed in FIGS. 4 and 5. After a predetermined time delay, the shuttle 22 will commence rotating about the body 14 to lay the first course of the winding on the body 14.

The body 14 will continue to advance in the clockwise direction so that as the first complete wrap of elongate material 12 approaches the initial position of the tacker arm 76, the outer end of the tacker arm 76, which is forcibly urged against the body 14, will have been moved toward the tacker apparatus 30 whereby the elongate material 12 will clear the outer end of the tacker arm 76 or, under unusual circumstances, will engage with the tapered corner 154 of the tacker arm 76 which will guide the elongate material 12 into position on the body 14 adjacent the first complete wrap of the elongate material. The second pass of the elongate material 12 will lay over part of the end portion 150 of the tacking tape 148 so as to trap the tape 148 between the second pass of the elongate material 12 and the body 14. The shuttle 22 will lay continuous spiral passes of elongate material 12 around the body 14 with the first couple of passes overlapping the end portion 150 of the tape 148. As the body 14 rotates, the carriage 58 and the tacker arm 76, which is forcibly urged against the body 14, will be moved axially to the left, as viewed in FIGS. 4 and 5, along the guides 64.

After a few passes of the shuttle 22 and, at about the time the shuttle 22 reaches full speed, the tacker arm 76 will have been moved to the dotted line position "B" of FIG. 5 and the ferrous portion 96 of the carriage 58 will pass in close proximity to and actuate the proximity switch 98 which sends an electrical signal to the computer, which directs an output signal to the control valve 122 which directs pressurized air to the rod end of the actuator 118 to retract the rod 120 and pivot the bellcrank 132 to unclamp the pad 144 from the elongate material 12. When the bellcrank 132 is fully pivoted, the ferrous portion 129 on the rod 120 will actuate the proximity switch 126 which sends an electrical signal to the computer which directs an output signal to the control valve 84 which directs pressurized air into the rod end of the actuator 78 to retract the rod 82, thereby pivoting the tacker arm 76 about the pivot 72 to move the tacker head 105 to the dotted line position "C" of FIG. 5. When the tacker arm 76 has pivoted fully to the position "C," the ferrous member 89 will actuate the proximity switch 88 which sends an electrical signal to the computer which directs an output signal to the control valve 48 which directs pressurized air into the rod end of the actuator 40 to retract the rod 42, carriage 58 and tacker arm 76 to the fully retracted position "D" shown in solid lines in FIG. 5, whereupon the ferrous member 54 will actuate the proximity switch 52 which sends an electrical signal to the computer to place the apparatus at rest.

The shuttle 22 will continue to spirally wind the elongate material 12 on the body 14 until the second flag 28 or 29 passes the initial proximity switch, which was passed by the first flag 28 or 29 to start the cycle, to arm the apparatus for completion of the cycle. The body 14 will continue to rotate until the next flag 28 or 29, which will be the same flag that initially activated the apparatus, passes and actuates the initial proximity switch which sends an electrical input signal to the computer to shut down the shuttle 22 and to arrest further rotation of the body 14 about its axis. The computer also sends an electrical output signal to valve 46 to direct pressurized air to the head end of the actuator 40 to move the rod 42, carriage 58 and tacker arm 76 forward to a position roughly equivalent to the dotted line position "A" of FIG. 4, where the tacker head 105 aligns with the starting and stopping passes of the elongate material 12. The ferrous portion 102 of the carriage 58 will be in a position to close the proximity switch 100 which will signal the controls to activate the valve 83 to admit pressurized air to the actuator 78 to drive the rod 82 forward to pivot the tacker arm 76 in a counterclockwise direction to forcibly engage the tacker head 105 against the initial and final passes of the elongate material 12 on the body 14. The tacker head 105 of the tacker arm 76 will hold the elongate material 12 under tension against the body 14 until the last pass of the elongate material 12 is hand stitched to the body 14, whereupon the elongate material 12 is severed near the body 14. A manual switch is activated to signal the valve 84 to direct pressurized air to the head end of the actuator 78 to pivot the tacker arm 76 about the pivot 72 to the dotted line position "A" of FIG. 4 with the ferrous portion 90 engaging the proximity switch 88 to signal the controls that the apparatus is ready for the next winding.

The loose end of the elongate material 12 can be grasped and pulled around the tacker head 105 with the elongate material 12 laid in a groove 114 on the face 116. The elongate material 12 is then drawn underneath the tacker arm 76 and into the notch 146 whereupon the actuator 118 is manually activated to pivot the bellcrank 132 so that long leg 140 is in the clamping position against the undersurface 142 of the tacker arm 76. The tacking tape 148 is inserted between the elongate material 12 and the head 105. The apparatus is now armed, ready for use in tacking the elongate material 12 against the next body 14 placed on the body-rotating apparatus as described hereinabove.

During the running of the shuttle 22 for winding the elongate material 12 on the body 14, if the elongate material 12 breaks, a switch will be tripped to actuate the forward motion of the tacker arm 76 and then the pivoting motion of the tacker arm to engage the tacker head 105 against the elongate material 12 and the body 14 until the break is repaired.

Other aspects, objects and advantages of this invention can be obtained from a study of the drawings, the disclosure and the appended claims.

I claim:

1. An apparatus (30) for holding and tacking material (12) on a body (14) during winding of said material (12) on said body (14) as said body is rotated in a plane past a material-winding shuttle (22), comprising:
    a base (34);
    a tacker arm (76) mounted on said base (34) and being movable between a first position at which said tacker arm (76) tacks the material (12) to said body (14), and a second position at which the tacker arm (76) is spaced from said body (14);
    a clamping member (104) carried by said tacker arm (76) and being movable between a clamped position at which material (12) is clamped on said tacker arm (76) and an unclamped position at which said tacker arm is free from said material (12);
    means (118) for moving said clamping member (104) between said clamped position and said unclamped position; and,
    means (78) for moving said tacker arm (76) between said first and said second positions, said means (78) moving said tacker arm (76) to said second position in response to moving said clamping member (104) from said clamped position to said unclamped position.

2. An apparatus (30), as set forth in claim 1, wherein said second position of said tacker arm (76) is radially outward from said body (14).

3. An apparatus (30), as set forth in claim 1, wherein said means (78) for moving said tacker arm (76) between said first and said second positions includes a pivot (72) carried by said base (34) and about which one end of said tacker arm (76) pivots, and actuating means (78) for pivoting said tacker arm (76) about said pivot (72) between said first position and said second position.

4. An apparatus (30), as set forth in claim 3, wherein said apparatus (30) includes a carriage (58) slideably mounted on said base (34), and said pivot (72) and said actuator means (78) are mounted on said carriage (58).

5. An apparatus (30), as set forth in claim 4, wherein said apparatus (30) includes an actuator means (40) for moving said carriage (58) and said tacker arm (76) between said second position of said tacker arm (76) and a third position (76) at which said tacker arm (76) is retracted generally tangentially from said second position, said actuator means (40) being mounted on said base (34) and connected to said carriage (58).

6. An apparatus (30), as set forth in claim 5, wherein said tacker arm (76) and said carriage (58) are moved in a generally tangential direction to said body (14) in response to rotation of said body (14), and said clamping member (104) is moved to said unclamped position in response to the movement of said tacker arm (76) in said tangential direction.

7. An apparatus (30) as set forth in claim 4, wherein the carriage (58) and tacker arm (76) are moved from said second position to the third retracted position in response to moving said tacker arm to said second position.

8. An apparatus (30), as set forth in claim 1, wherein said apparatus (30) includes a tacker head (105) mounted on said tacker arm, said clamping member (104) being adapted to secure said material across said tacker head (105) in alignment with said body (14), and said means (78) for moving said tacker arm (76) between the first and second positions is of a construction sufficient for holding said tacker head (105) and said material (12) against said body (14) as said material (12) is wound on the body (14).

9. An apparatus (30), as set forth in claim 1, wherein said clamping member (104) includes:
    a bellcrank lever (132) pivotally mounted on said tacker arm (76) and having a pair of angularly disposed legs (136,140) extending from said pivot mounting; and wherein said means (118) for moving said clamping member is connected to one leg (136) of said bellcrank lever (132).

10. A method for holding and tacking material (12) without slack to a body (14) during start up and upon stopping the winding of said material (12) on said body (14), said body (14) being movable in a plane about the axis of rotation of said body (14), a shuttle being (22) rotatably driven about said body (14) in a plane transverse to said body (14) and having a supply of material (12) carried by said shuttle (22), said material (12) being drawn from said supply and being advanced to said body (14) without slack, comprising:

clamping the material (12) to a tacker arm (76);

moving said tacker arm (76) and said material (12) into a contact position against the surface of said body (14);

holding said tacker arm (76) against said body (14) as said tacker arm (76) is moved in a generally tangential direction in response to moving said body (14);

unclamping the material (12) from said tacker arm (76) in response to moving the tacker arm (76) to a predetermined position; and moving the tacker arm (76) to a position spaced from said body (14).

11. The method, as set forth in claim 10, including moving said tacker arm (76) tangentially of the body (14) to a retracted position after moving the tacker arm (76) to said position spaced from said body (14).

12. The method, as set forth in claim 11, including moving said tacker arm (76) from said retracted position to said position spaced from said body (14), moving said tacker arm (76) into contact with said body (14), and holding at least a last winding of the material (12) against said body (14).

13. The method, as set forth in claim 12, wherein moving the tacker arm (76) into contact against the body (14) and holding at least the last winding of the material (12) against said body (14), is in response to completing the winding of the material (12) and stopping the rotation of the body (14) and the shuttle (22).

14. An apparatus (30) for holding and tacking material (12) against a body (14) during winding of said material (12) on said body (14) as said body is rotated in a plane past a material-winding shuttle (22), comprising:

a base (34);

a tacker arm (76) pivotally carried by the base (34);

clamping means (104) for securing the end of said material (12) to said tacker arm (76) and subsequently releasing the end of said material (12) from said tacker arm (76); said clamping means (104) being mounted on said tacker arm; and, means (78) for pivoting said tacker arm (76) between a first position at which said material (12) is urged into contact with said body (14) and held against said body (14) as said rotation of the body (14) moves said tacker arm (76) in the direction of rotation of said body (14), and a second position at which said tacker arm (76) is spaced from said body (14).

15. An apparatus (30), as set forth in claim 14, wherein said apparatus (30) includes:

a carriage (58) slideably mounted on said base (34);

a pivot (72) carried by said carriage (58) and pivotally supporting said tacker arm (76);

an actuator (40) mounted on said base (34) and connected to said carriage (58), said actuator (40) being of a construction sufficient for moving said carriage (58) and said tacker arm (76) between a tacking position and a rest position; and, a second actuator (78) mounted on said carriage (58) and connected to a bracket (92) on said tacker arm (76) and being of a construction sufficient for pivoting said tacker arm (76) about said pivot (72) between said first position and said second position.

16. An apparatus (30), as set forth in claim 15, wherein said clamping means (104) includes:

a bellcrank lever (132) pivotally mounted on said tacker arm (76) said lever (132) having a pair of legs (136,140) extending from said pivot mounting; and, an actuator (118) carried by said tacker arm (76) and having an extendible rod (120), said actuator being adapted to pivot the bellcrank lever (132) and lock said material (12) between the other leg (140) of the bellcrank lever (132) and said tacker arm (76).

* * * * *